United States Patent
Li et al.

(10) Patent No.: US 11,068,622 B2
(45) Date of Patent: *Jul. 20, 2021

(54) INFORMATION PROCESSING APPARATUS AND INFORMATION PROCESSING METHOD

(71) Applicant: Sony Corporation, Tokyo (JP)

(72) Inventors: Ji Li, Beijing (CN); Zhihui Zhang, Beijing (CN)

(73) Assignee: SONY CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/714,832

(22) Filed: Dec. 16, 2019

(65) Prior Publication Data

US 2020/0117837 A1 Apr. 16, 2020

Related U.S. Application Data

(63) Continuation of application No. 15/450,105, filed on Mar. 6, 2017, now Pat. No. 10,534,868.

(30) Foreign Application Priority Data

Jun. 14, 2016 (CN) .......................... 201610421658.9

(51) Int. Cl.
G06F 30/00 (2020.01)
G06F 21/10 (2013.01)
G06F 21/60 (2013.01)

(52) U.S. Cl.
CPC .............. *G06F 30/00* (2020.01); *G06F 21/10* (2013.01); *G06F 21/608* (2013.01); *G06F 2221/074* (2013.01)

(58) Field of Classification Search
CPC ........ G06F 30/00; G06F 21/10; G06F 21/608; G06F 2221/074

(Continued)

(56) References Cited

U.S. PATENT DOCUMENTS 7,251,347 B2 * 7/2007 Smith ................ G06K 9/00577
340/5.8
7,576,842 B2 * 8/2009 Park ................... G06K 9/00577
356/71

(Continued)

FOREIGN PATENT DOCUMENTS

CN      106228167 B   *   4/2018

OTHER PUBLICATIONS

Google Patents Translation of CN106228167B on Oct. 24, 2020, 9 pages. (Year: 2020).*

(Continued)

*Primary Examiner* — Kamini S Shah
*Assistant Examiner* — Faraj Ayoub
(74) *Attorney, Agent, or Firm* — Xsensus, LLP

(57) ABSTRACT

An information processing apparatus includes one or more processors to acquire a shape characteristic of a target entity; determine similarity between the shape characteristic of the target entity and a shape characteristic of a three-dimensional model; acquire a material characteristic of a material in a designated region of the target entity where the shape characteristic of the target entity matches with the predetermined shape characteristic; and determine an extent to which the acquired material characteristic matches a predetermined material characteristic based upon a magnitude of differences between the acquired material characteristic and the predetermined material characteristic. The predetermined material characteristic is correlated with the designated region of the three-dimensional model The apparatus determines that the target entity is one of a genuine copy and a pirated copy based on the determined extent to which the acquired material characteristic of the target entity matches the predetermined material characteristic.

13 Claims, 11 Drawing Sheets

(58) Field of Classification Search
USPC .............................................................. 703/1
See application file for complete search history.

(56) References Cited

U.S. PATENT DOCUMENTS

| | | | | |
|---|---|---|---|---|
| 9,280,696 | B1* | 3/2016 | Fraser | G06K 9/00288 |
| 9,384,390 | B2* | 7/2016 | Rhoads | G06K 9/00456 |
| 10,037,537 | B2* | 7/2018 | Withrow | G06K 9/00577 |
| 10,534,868 | B2* | 1/2020 | Li | G06F 30/00 |
| 2013/0284803 | A1 | 10/2013 | Wood et al. | |
| 2017/0263011 | A1* | 9/2017 | Yalniz | G06K 9/3233 |

OTHER PUBLICATIONS

Fabian, "10 Examples of How 3D Printing is Changing Consumer Products", Mar. 18, 2015, 13 pages, Accessed at https://i.materialise.com/blog/en/10-examples-of-how-3d-printing-is-changing-consumer-products-meet-10-3d-printing-experts-and-their-dreams/ (Year: 2015).*

Chou et al. "A public fragile watermarking scheme for 3D model authentication", Computer-Aided Design 38, 2006, pp. 1154-1165. (Year: 2006).*

Fabian, "10 Examples of How 3D Printing is Changing Consumer Products", 3D Printing Blog, Mar. 18, 2015, 13 pages, Accessed at https://i.materialise.com/blog/en/10-examples-of-how-3d-printing-is-changing-consumer-products-meet-10-3d-printing-experts-and-their-dreams/ (Year: 2015).

* cited by examiner

US 11,068,622 B2

INFORMATION PROCESSING APPARATUS AND INFORMATION PROCESSING METHOD

CROSS-REFERENCE TO RELATED APPLICATIONS

The present application is a continuation of U.S. application Ser. No. 15/450,105, filed Mar. 6, 2017, which claims priority to CN 201610421658.9, filed Jun. 14, 2016, the entire contents of each are incorporated herein by reference.

FIELD

The present disclosure generally relates to the field of information processing, and in particular to an information processing apparatus and an information processing method for protecting intellectual property related to a three-dimensional model.

BACKGROUND

With wide applications of technology related to a three-dimensional (3D) model, such as 3D printing technology and 3D scanning technology, it is a new challenge to protect intellectual property (such as a patent right, a copyright or a design patent) of the 3D model. In one aspect, it is easy for a 3D printer to reprint a pirated or counterfeit 3D entity according to an existing 3D model file. In the other aspect, even if there is no existing 3D model file, a shape of an existing 3D entity can still be acquired by the 3D scanning technology, and a 3D model file can be remodeled, and then a pirated or counterfeit 3D entity can also be formed by the 3D printer. In this case, it is difficult for an owner, a designer, a manufacturer and the like of the 3D model to protect intellectual property of the 3D model.

Existing intellectual property protection technology such as Digital Rights Management (DRM) is adopted to control the usage and distribution of digital contents. The DRM technology has been adopted to protect digital contents such as music, movies and electronic books (eBooks). DRM technology is primarily an access control technology, by means of particular software, a user is requested to enter authorization information to limit an access on a specific device. Alternatively, content is encrypted to limit an unauthorized access. The DRM technology may also be used to protect a distribution of the 3D model file. However, a behavior such as generating a pirated or counterfeit 3D entity with the 3D scanning technology cannot be prevented only by protecting the 3D model file.

SUMMARY

An information processing apparatus is provided according to an embodiment. The information processing apparatus includes one or more processors configured for: acquiring a material characteristic of at least one portion of a target entity; matching the material characteristic of the target entity with a predetermined material characteristic, where the predetermined material characteristic is correlated with at least one portion of a three-dimensional model; and generating, based on a result of the matching, information indicative of a correlation between the portion of the target entity and the portion of the three-dimensional model.

An information processing method is provided according to another embodiment. The information processing method includes: acquiring a material characteristic of at least one portion of a target entity; matching the material characteristic of the target entity with a predetermined material characteristic, where the predetermined material characteristic is correlated with at least one portion of a three-dimensional model; and generating, based on a result of the matching, information indicative of a correlation between the portion of the target entity and the portion of the three-dimensional model.

An information processing apparatus is provided according to another embodiment. The information processing apparatus includes a storage device configured for storing a database of predetermined material characteristic of each three-dimensional model in a three-dimensional model set, where the predetermined material characteristic is correlated with at least one portion of a corresponding three-dimensional model. The information processing apparatus further includes a communication device configured for: receiving, from a requester, a request for the predetermined material characteristic of a specific three-dimensional model; and transmitting the predetermined material characteristic of the specific three-dimensional model to the requester.

An information processing method is provided according to another embodiment. The information processing method includes: storing a database of predetermined material characteristic of each three-dimensional model in a three-dimensional model set, where the predetermined material characteristic is correlated with at least one portion of a corresponding three-dimensional model; receiving, from a requester, a request for the predetermined material characteristic of a specific three-dimensional model; and transmitting the predetermined material characteristic of the specific three-dimensional model to the requester.

With the apparatus and method according to the embodiments of the present disclosure, a pirated or counterfeit 3D entity can be effectively identified, thereby facilitating protection of intellectual property of a 3D model.

BRIEF DESCRIPTION OF THE DRAWINGS

The present disclosure may be better understood with reference to the description given in conjunction with the drawings hereinafter. The same or similar components are represented by the same or similar reference characters in the drawings. The drawings together with the detailed description below are incorporated in the specification and form a part of the specification, for further exemplifying preferred embodiments of the present disclosure and explaining the principle and advantages of the present disclosure.

DETAILED DESCRIPTION OF EMBODIMENTS

Figure 1:
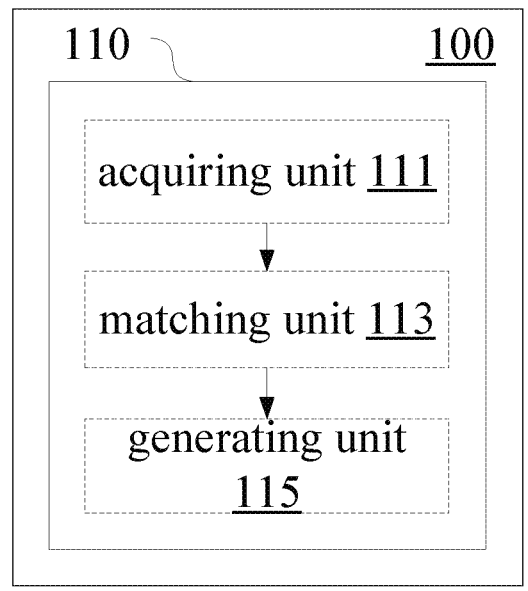
FIG. 1 is a block diagram showing a configuration example of an information processing apparatus according to an embodiment of the present disclosure.

Hereinafter, the embodiments of the present disclosure are described with reference to the drawings. Elements and features depicted in one of the drawings or one embodiment of the present disclosure may be combined with elements or features depicted in one or more other drawings or embodiments. It should be noted that, representation and description of components and processing, which are known by those skilled in the art and are irrelevant to the present disclosure, are omitted in the drawings and the specification for clarity.

As shown in FIG. 1, an information processing apparatus 100 according to an embodiment includes a processor 110. The processor 110 includes an acquiring unit 111, a matching unit 113 and a generating unit 115. It should be noted that, although the acquiring unit 111, matching unit 113 and generating unit 115 are shown as function modules in the drawings, it should be understood that, functions of the acquiring unit 111, the matching unit 113 and the generating unit 115 may also be realized by the processor 110 as a whole, rather than realized with discrete components in the processor 110. In addition, although the processor 110 is shown as one block in FIG. 1, the information processing apparatus 100 may include multiple processors, and the functions of the acquiring unit 111, the matching unit 113 and the generating unit 115 may be distributed to multiple processors. In this way, the functions can be realized by coordinated cooperation of the processors.

The acquiring unit 111 is configured for acquiring a material characteristic of at least one portion of a target entity. The target entity refers to an entity as a detection object. With the apparatus and method according to the embodiments of the present disclosure, whether the target entity is pirated or counterfeit is identified based on the material characteristic of the target entity.

As described in detail in conjunction with the embodiments below, the material characteristic may be characterized by, for example, a visual characteristic, or a physical characteristic, a chemical characteristic or the like of a material. In a case that the material characteristic is characterized by the visual characteristic, the material characteristic may be acquired in a visual manner. In a case that the material characteristic is characterized by the physical characteristic or the chemical characteristic, the material characteristic may be acquired by corresponding detection means.

The matching unit 113 is configured for matching the material characteristic of the target entity with a predetermined material characteristic. The predetermined material characteristic is correlated with at least one portion of a 3D model.

The 3D model is a model as a protection object of intellectual property. For example, the 3D model may include a 3D printing model. However, the present disclosure is not limited thereto. For example, the 3D model as the protection object of intellectual property may be a 3D entity (herein, "3D entity" may also be abbreviated as "entity") manufactured in a way other than 3D printing.

In addition, it should be noted that, the entity (or 3D model) herein includes not only a manufactured product with an apparent 3D configuration, but also, for example, a sheet-shaped manufactured product. Physical products in the real world all have dimensions of length, width and height (or thickness), hence can be considered as falling within the scope of the 3D entity (or 3D model) herein.

Specifically, for example, the matching unit 113 may acquire the predetermined material characteristic described above from an identification information database established for a protected original entity. The protected original entity is made from a specified material according to a 3D model. For example, the 3D model is printed based on information on a material constructing the entity in addition to a 3D model file. That is to say, the protected original entity is formed based on specified material for constructing the entity. In another aspect, a pirated or counterfeit entity is generally constructed with, for example, a cheap material to obtain more profits. Alternatively, for example, since a producer of the pirated and counterfeit entity cannot acquire the predetermined material characteristic, the pirated and counterfeit entity is generally made from a material other than the predetermined material described above, so the pirated and counterfeit entity do not have the predetermined material characteristic described above.

It should be noted that the at least one portion of the target entity described above may include the whole target entity. Correspondingly, at least one portion of the 3D model may include the whole 3D model. In other words, the material characteristic may be acquired and matched for the whole target entity and the whole 3D model or for a portion of target entity and a portion of the 3D model.

In addition, the predetermined material characteristic may include a specific composition contained in the material or a specific composition combination of the material. For example, the specific composition or the specific composition combination makes the material have a specific visual characteristic or a specific physical or chemical characteristic. In conclusion, the predetermined material characteristic can be detected in a visual manner or in a physical or chemical manner, thus it can be identified, with the predetermined material characteristic, whether the target entity has a material characteristic same as that of a protected 3D model.

Next, an exemplary embodiment in which the material characteristic is characterized by the visual characteristic and an exemplary embodiment in which the material characteristic is characterized by the physical or chemical characteristic are described, respectively.

According to an embodiment, the material characteristic acquired from the target entity and the predetermined material characteristic of the protected 3D entity are characterized by a visual characteristic. In this case, matching the material characteristic of the target entity with the predetermined material characteristic may include matching an image of the target entity with an image of a reference entity, where the reference entity is made from a predetermined material based on a 3D model.

For example, the visual characteristic may include brightness, chroma, grayscale and the like. For example, the visual characteristics may be extracted from two-dimensional images acquired under a same light condition with a computer visual analysis method. For example, two-dimensional images, at multiple view angles, of a protected original entity may be captured under a determined light condition, and brightness values, chroma values and the like of different regions of the two-dimensional images are respectively calculated. Correspondingly, two-dimensional images, at multiple view angles, of an entity to be detected are captured under a same light condition as the above, and brightness values and chroma values of different regions are extracted, and compared with the values of the protected original entity. Under the same light condition, different materials have different visual characteristics, which may be used for distinguishing different materials.

Figure 10:
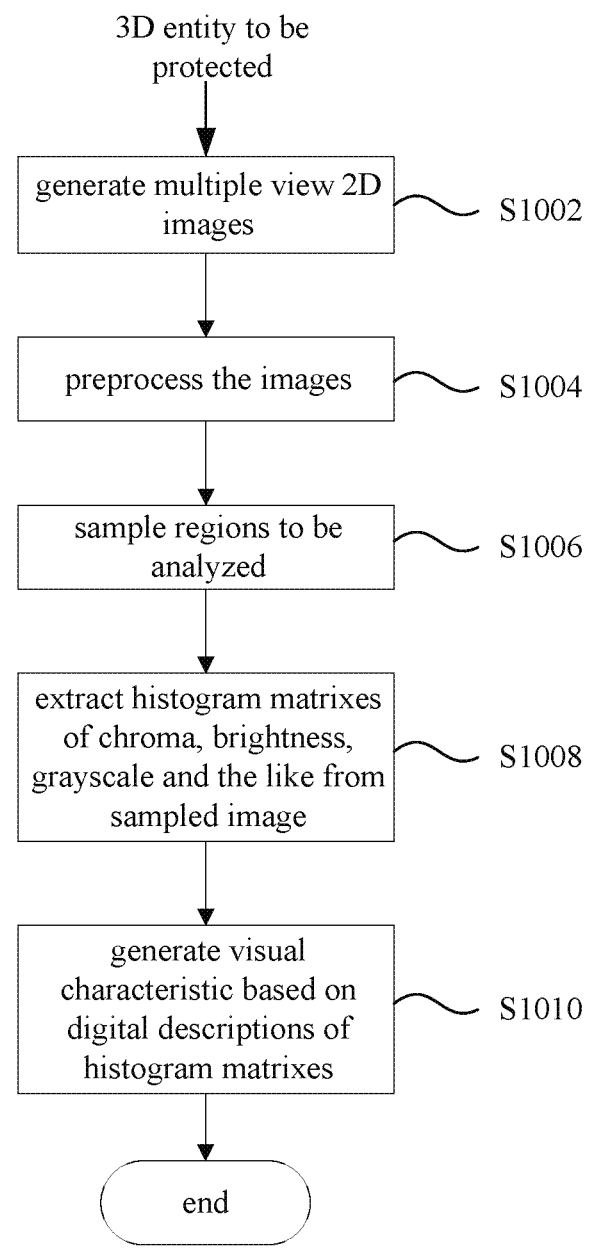
FIG. 10 is a flowchart showing an exemplary process for calculating a visual characteristic based on a material according to an embodiment of the present disclosure.

FIG. 10 shows an exemplary process for calculating a visual characteristic of a material. In step S1002, 2D images at multiple view angles are generated. In step S1004, the images are pre-processed. In step S1006, regions to be analyzed are sampled. In step S1008, histogram matrixes of chroma, brightness, grayscale and the like are extracted from a sampled image. In step S1010, a visual characteristic is generated by digital descriptions for the histogram matrixes. Although FIG. 10 shows an exemplary process for acquiring a visual characteristic of a 3D entity to be protected, the process may also be used to acquire a visual characteristic of an entity to be detected.

More particularly, first, multiple 2D images of the entity to be detected at different view angles may be generated by an image sensor, a camera, an infrared sensor and the like. In order to improve accuracy of detection, the generated 2D images may be pre-processed, a 3D object to be detected is separated from the background in the 2D image and an edge portion is excluded by contour analysis of computer vision. Secondly, the separated 3D object is sampled, and multiple small regions are sampled at different positions as analysis samples. Each of the samples is an image with a smaller size than the original image, for example, multiple images regions with 64×64 pixels are sampled. Characteristics are extracted in sequence from the multiple analysis samples obtained by the sampling, such as a brightness matrix and a chroma matrix in visible light/infrared photography image, and histograms are generated by performing statistic distributions of the brightness matrix and the chroma matrix, as a final material characteristic. Then, material characteristics are matched in a histogram matching manner. It is determined whether the material of the detected entity is the same as the material of the reference entity depending on whether the material characteristic of the detected entity matches with the material characteristic of the reference entity. If the visual characteristic of the detected entity is far different from a visual characteristic corresponding to the material of the reference entity (such as exceeds a predetermined threshold), it is determined that the materials are different.

Different 3D printing materials have different visual characteristics, so different materials may be distinguished by comparing characteristics in the 2D images. For example, for an acrylonitrile-butadiene-styrene copolymer (ABS) material and a polylactic acid (PLA) material which are common in 3D printing, a non-colored ABS is semi-transparent and a non-colored PLA is transparent under a visible light, hence brightness and chroma are different in respective the 2D images.

For example, the material characteristic may be identified based on the visual characteristic in a manner described in the following literatures: a measuring image method for the total head rice rate, grain type, chalkiness rate, chalkiness degree and transparency of rice in an agriculture standard NY/T2334-2013; and CN201310172280.X entitled "METHOD FOR DETECTING RICE TRANSPARENCE".

In the manner based on the visual characteristic, for example, with a non-destructive detection method of the computer vision analysis, material characteristics matching can be performed without damaging the entity to be detected. Such a manner is convenient and has no damage to the entity to be detected.

According to another embodiment, the material characteristic acquired from the target entity and the predetermined material characteristic of the protected 3D model may include one or more of: a chemical property, a microstructure characteristic, a combustion characteristic, a dissolving characteristic, a transmittance, a reflectivity, a perspective structure characteristic under X-rays, a position and/or an embedding manner of a specific material in an entity, and the like.

The material characteristics may be detected with a dedicated material detection method such as a chemical method and solvent experiment, and a combustion test, or is detected with a dedicated instrument such as a high power microscope, a transmittance tester and a reflectivity tester. Different materials generally have different melting points, different smells and different flame colors when being combusted, and generally have different reactions under different solvents. For example, a process temperature of PLA is 200 degrees centigrade, and a process temperature of ABS is above 220 degrees centigrade. PLA has blue flame when being combusted, and ABS has yellow flame when being combusted. In addition, different materials may be distinguished by measuring transparency of the materials with the transmittance tester or by measuring reflectivity of the materials with the reflectivity tester. The transmittance tester can quantitatively measure transparency of a material by detecting a light transmittance of the material. The reflectivity tester detects a light reflectivity of a material. Samples having specified sizes are generally needed for the transmittance tester and the reflectivity tester, so it is a destructive detection method.

Although the material characteristic may be acquired by damaging the target entity in the exemplary method described above, a destructive detection method has higher detection accuracy.

Particular material characteristic may further include usage information of the material in the 3D printing, such as embedding a specified material in a designated region, i.e., information on an embedding position of the material.

Continue referring to FIG. 1, the generating unit 115 is configured for generating, based on a matching result, information indicative of correlation between the portion of the target entity and the portion of the 3D model. That is to say, it is determined whether the target entity is pirated or counterfeit by detecting whether a material characteristic for constructing the target entity matches with the predetermined material characteristic of the protected entity.

In the embodiment described above, it is assumed that it is known (for example, determined by naked eyes) that a shape of the target entity corresponds to a shape of the protected 3D model, and on this basis, the target entity is identified by comparing the material characteristics. In addition, for example, in a case that there are multiple protected 3D models and it is not known in advance whether the shape of the target entity corresponds to a shape of one of the multiple protected 3D models, according to an embodiment, the shape of the target entity may be analyzed at first. In a case that the shape of the target entity is similar to or same as a shape of one of the multiple protected 3D models, it is determined whether the target entity is pirated or counterfeit by determining whether the material characteristic of the target entity conforms to a corresponding predetermined material characteristic.

The embodiment is described also by referring to FIG. 1. In addition to acquiring the material characteristic of the target entity, the acquiring unit 111 is further configured for acquiring a shape characteristic of the target entity. The matching unit 113 is further configured for matching the shape characteristic of the target entity with a shape characteristic of a 3D model, in addition to matching the material characteristic of the target entity with the predetermined material characteristic of the 3D model. The generating unit 115 is configured for generating information indicative of correlation based on a matching result for the shape characteristic and a matching result for the material characteristic.

Furthermore, according to an embodiment, the material characteristic is acquired and matched only in a case that the shape characteristic of the target entity matches with the predetermined shape characteristic. That is to say, the acquiring unit 111 and matching unit 113 firstly acquires and matches the shape characteristic, and then acquires and matches the material characteristic only in a case that there is a 3D model having a shape characteristic matching with the shape characteristic of the target entity, thereby reducing processing load and improving a detection efficiency.

In addition, according to an embodiment, the shape characteristic is acquired by scanning a target entity. An embodiment in which the shape characteristic is acquired and matched will be described below in conjunction with an example.

In addition to the material characteristic, an embodiment of the present disclosure may further include identifying a pirated or counterfeit entity based on a process characteristic, a watermark and the like. For example, the process characteristic includes surface polishing, coloring, brushing and the like, and can be identified effectively with a vision analysis method. The watermark may be formed with a conventional watermark embed manner. For example, a watermark pattern is printed on a surface of a 3D entity, or watermark information may be expressed by a 3D shape such as specified concave and convex, or the watermark information may be embedded with different materials. By detecting and matching the process characteristic and/or the watermark information, accuracy of the identification process can be further improved.

For example, the information processing apparatus according to the embodiments described above may acquire the predetermined material characteristic and the shape characteristic of the 3D model from an external data source via a communication device. Alternatively, information containing the predetermined material characteristic and the shape characteristic of the 3D model can be stored in the information processing apparatus.

Figure 2:
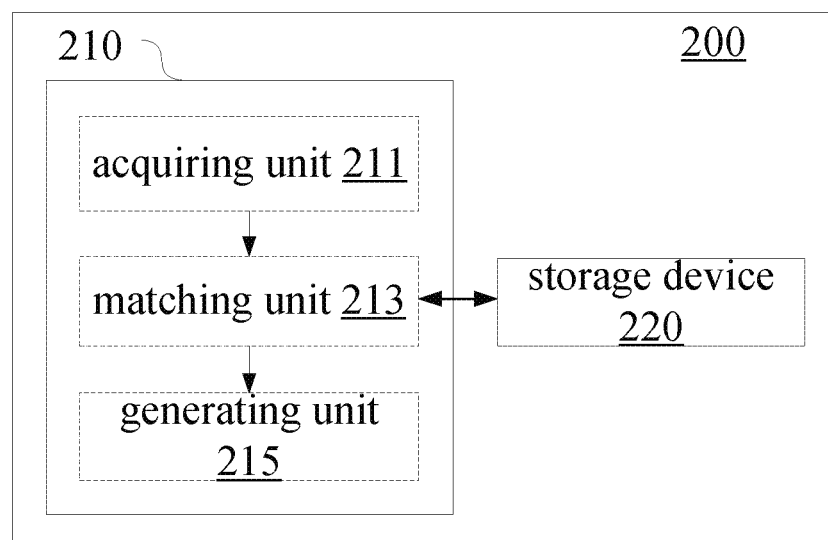
FIG. 2 is a block diagram showing a configuration example of an information processing apparatus according to another embodiment of the present disclosure.

As shown in FIG. 2, an information processing apparatus 200 according to the embodiment includes a processor 210 and a storage device 220. The processor 210 includes an acquiring unit 211, a matching unit 213 and a generating unit 215. Configurations of the acquiring unit 211, the matching unit 213 and the generating unit 215 are similar to the acquiring unit 111, matching unit 113 and generating unit 115 described above with reference to FIG. 1.

The storage device 220 is configured for storing predetermined material characteristics of each three-dimensional model in a predetermined three-dimensional model set. The matching unit 213 matches a material characteristic of a target entity with a predetermined material characteristic stored in the storage device 220.

In addition, the storage device 220 may further store information for matching a shape of a target entity with a shape of a 3D model.

Specifically, for example, the storage device 220 may store information database for identifying a target entity, including digitized information on one or more characteristic information of a specific material, such as a 2D image under a specific light condition for representing a visual characteristic, a photomicrograph for representing a microstructure characteristic, and a specific testing parameter and testing result for representing transmittance and reflectivity, etc.

Figure 6:
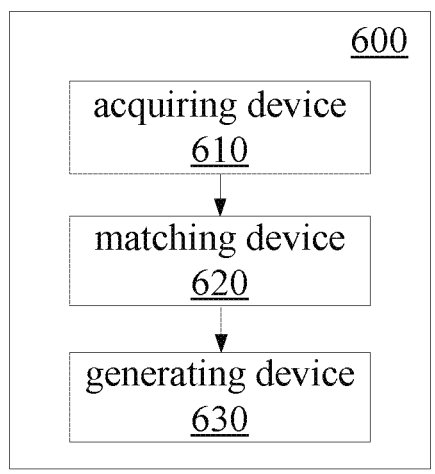
FIG. 6 is a block diagram showing another configuration example of the information processing apparatus according to the embodiment of the present disclosure.

FIG. 6 shows a block diagram showing another configuration example of the information processing apparatus according to the above embodiment of the present disclosure. The information processing apparatus 600 includes an acquiring device 610, a matching device 620 and a generating device 630. The acquiring device 610 is configured for acquiring a material characteristic of at least one portion of a target entity. The matching device 620 is configured for matching the material characteristic of the target entity with a predetermined material characteristic, where the predetermined material characteristic is correlated with at least one portion of a 3D model. The generating device 630 is configured for generating information indicative of correlation between the portion of the target entity and the portion of the 3D model based on a matching result.

In the forgoing description for the information processing apparatus according to the embodiments of the present disclosure, some methods and processes are apparently disclosed. Next, an information processing method according to an embodiment of the present disclosure is described without repeating the details described above.

Figure 3:
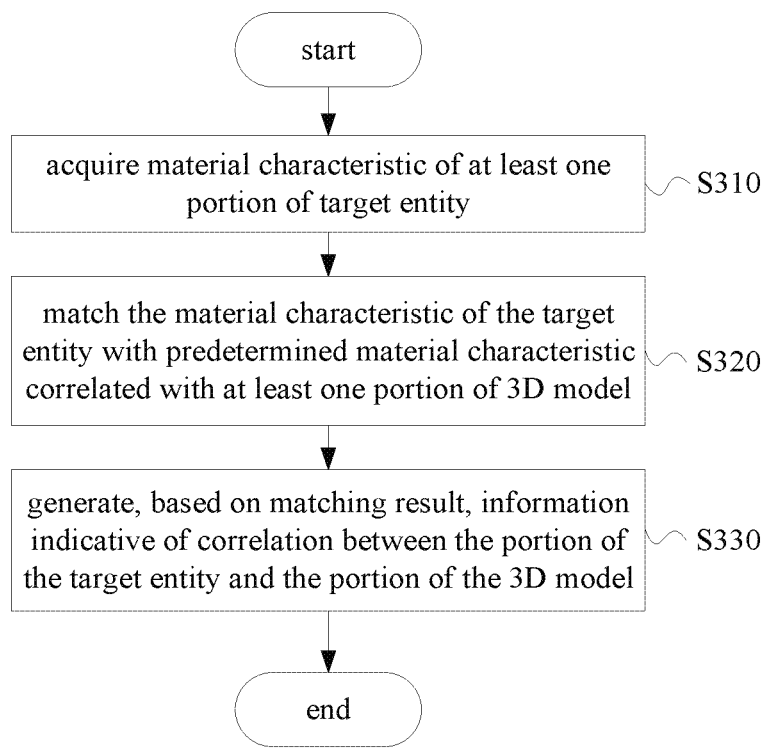
FIG. 3 is a flowchart showing a process example of an information processing method according to an embodiment of the present disclosure.

As shown in FIG. 3, the information processing method according to the embodiment includes the following steps.

In step S310, a material characteristic of at least one portion of a target entity is acquired.

In step S320, the material characteristic of the target entity is matched with a predetermined material characteristic, where the predetermined material characteristic is correlated with at least one portion of a 3D model.

In step S330, information indicative of correlation between the portion of the target entity and the portion of the 3D model is generated based on a matching result.

In addition, according to an embodiment, the information processing method may further include acquiring a shape characteristic of the target entity and matching the shape characteristic of the target entity with a shape characteristic of the 3D model. Furthermore, according to an embodiment, the shape characteristics may be acquired and matched firstly, and the material characteristics are acquired and matched only in a case that there is a 3D model having a shape characteristic matching with the shape characteristic of the target entity.

Figure 8:
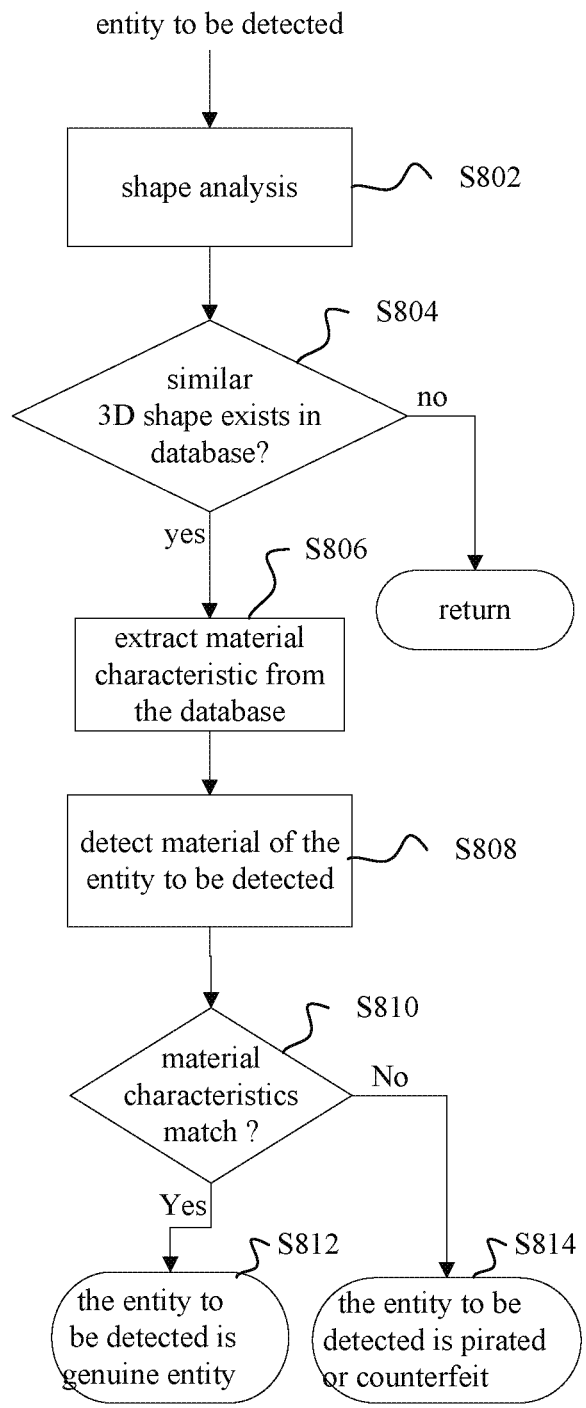
FIG. 8 is a flowchart showing an exemplary process of detecting intellectual property information based on a material according to an embodiment of the present disclosure.

FIG. 8 shows a detection process according to an exemplary embodiment. In step S802, a shape of an entity to be detected is detected. In a case that there is a known 3D entity with a similar or same shape in an identification information database ("yes" in step S804), a material characteristic is extracted in step S806. In step S808, a material characteristic of the entity to be detected is detected based on the extracted material characteristic. If the detected material characteristic does not conform to the material characteristic in the identification information database ("no" in step S810), the 3D entity is identified as a pirated or counterfeit version of the known 3D entity (S814). If the detected material characteristic conforms to the material characteristic in the identification information database ("yes" in S810), the detected entity is identified as a protected original version of the known 3D entity (S812).

In the following, the embodiment of the present disclosure is described in more detail in conjunction with an example. It should be understood that, the present disclosure is not limited to specific details given in the following example.

In the example, an intellectual property owner establishes an identification information database and detects a counterfeit 3D entity.

An identification information database for a 3D entity includes a shape characteristic, a material characteristic and (optional) related intellectual property information, of a protected original 3D entity. The shape characteristic is used for comparing with that of a 3D entity to be detected regarding whether the shapes are same or similar. The material characteristic is used for comparing with a material characteristic of the 3D entity to be detected. The related intellectual property information provides intellectual property description information for the 3D entity in the database. As shown in Table 1 below:

TABLE 1

| Property | Master ID | 3D model file | Shape robust characteristic | intellectual property information | Material information ID |
|---|---|---|---|---|---|
| Type | Numeric value | File | object | text | Numeric value |

In Table 1, the shape characteristic of the 3D entity is represented by a 3D shape robust characteristic. The 3D shape robust characteristic is calculated from a 3D model, and is generally a set of vectors, and the robust characteristic remains unchanged under robustness operations such as rotating or blurring the 3D shape. Regarding the 3D model, the intellectual property owner generally owns a 3D model corresponding to a 3D entity, for generating the 3D entity in 3D printing. Alternatively, a 3D entity may be generated from a protected original 3D entity by an existing 3D scanning apparatus.

The 3D shape robust characteristic may be a global characteristic such as a D2 shape characteristic. A process of calculating a 3D shape robust characteristic of a model may includes the following steps. A surface of the 3D model is divided into multiple triangular surfaces, this step may be omitted for the file format such as STL since the 3D model has been represented as a set of triangular surfaces. Then, the total area of all of the triangular surfaces is calculated, a triangular surface is selected by taking a proportion of the area of the triangular surface to the total area as a selection probability of the triangular surface. A total of N random points need to be selected and a proportion of the area of a triangular surface X to the total area of all of the triangular surfaces is q, the number of times for selecting the triangular surface X is N*q. A random point is selected in any one of the selected triangular surfaces, a distance between the any two of the selected N random points and a distribution function $y=f(x)$ thereof are calculated, where x is a distance value between characteristic points and y is a distribution probability (a percentage of the distance value to the total $N(N-1)/2$ distance values) corresponding to the distance value. The distribution is sampled to calculate a histogram, so as to obtain a multi-dimensional vector as a 3D shape robust characteristic. The number of dimensions of the vector equals to the number of samples for sampling the distribution, and a value of each dimension equals to an average value of probabilities falling within a sampling region. Further, the characteristic vector is quantized as a multi-bit robust hash value. The calculation of characteristic here is based on the random points on the surface of the 3D model, and has invariability with respect to various transformations of random sampling, such as invariability with respect to rigid body motion and mirror transformation. Moreover, the random sampling makes the final robust characteristic has robustness with respect to fine disturbance such as adding random noise and small convex-concave change or small rupture on the surface. In addition, the 3D robust characteristic here also has robustness with respect to scale transformation, that is, the 3D robust characteristic is unchanged or changed little in a case that size of the 3D model is enlarged or reduced. The robustness and the accuracy of feature matching are also related to the selection of parameters. The higher the sampling density is, the higher the matching accuracy of a final calculated characteristic is, and the lower the robustness is. The lower the sampling density is, the higher the robustness is. In an actual application, parameters to be selected may be determined according to an experiment. The robust characteristics are matched by calculating a Hamming distance between the robust hash values.

The 3D shape robust characteristic described above may also be a local characteristic, such as a 3D SURF characteristic. Firstly, robust characteristic points are selected on a surface of a 3D shape, and the characteristic points may be selected with a Harris 3D characteristic point method. In the Harris 3D characteristic point method, a vertex of the surface of the 3D shape is selected as a characteristic point. A characteristic point value of each vertex, i.e., a Harris value, is calculated based on a normal vector of the vertex and a normal vector of a point adjacent to the vertex. And a vertex having a local maximum characteristic point value, i.e., a corner point, is selected as a characteristic point. A SURF characteristic value is calculated for each characteristic point, and a set of the generated characteristic values are taken as the 3D shape robust characteristics. Each SURF characteristic value is a multi-dimensional vector. Further, the 3D shape robust characteristics are quantized to generate 3D shape robust Hash values. In an actual application of robust Hash, the description of the robust characteristic is generally large and is not suitable for being directly used as a robust Hash value, and needs to be compressed.

According to the method of the present disclosure, each dimension of vectors of a characteristic point may be quantized as one or more bits. A specific method includes: clustering characteristic points; calculating an average value for each dimension of each cluster; and quantizing as 1 in a case that each dimension of vectors of each characteristic point is greater than the average value, otherwise, quantizing as 0. Each dimension of vectors may be compressed and quantized as multiple bits. Multiple quantization regions may be set based on the average value described above, and each region corresponds to multiple bits of a binary values. If each dimension of vectors of each characteristic point falls within a certain quantization region, the dimension of vectors is quantized as multiple bits in the region. The more the quantization regions are, the higher the accuracy of characteristic point matching is, and the longer a final robust Hash value is. Similarly, the robust characteristics are matched by calculating a Hamming distance between robust Hash values. The 3D robust characteristic here has robustness with respect to transformation operations such as non-rigid transformation, topology transformation, local or global scale transformation, additive noise, a hole on a surface, and shot noise and down sampling.

The protected original 3D entity is generated with a specified material and designated usage information. The specified material includes a conventional 3D printing material added with a specified substance, a combination of multiple 3D printing materials and a new type of 3D printing material. The specified material may be distinguished from other materials in terms of one or more material characteristics. The usage information on the specified material includes globally using, in the 3D entity, a combination of a common 3D printing material and one composition or a specific composition, or a compound generated with multiple specified composition. For example, a metal material, a ceramic material and the like are added to a common plastic material such as ABS and PLY.

In the following, an example of a composition of the material is given.

A content of the common 3D printing material is x % and a content of a specified composition is y %.

Alternatively, a content of a specified composition 1 is $X^1$%, a content of a specified composition 2 is $X^2$%, a content of a specified composition 3 is $X^3$%, . . . and a content of a specified composition n is $X^n$%.

In the following, an example that different material compositions are used in different regions of the 3D entity is given.

In region 1, a content of a specified composition 1 is $X_1^1$%, a content of a specified composition 2 is $X_1^2$%, a content of a specified composition 3 is $X_1^3$%, . . . a content of a specified composition n is $X_1^n$%.

In region 2, a content of the specified composition 1 is $X_2^1$%, a content of the specified composition 2 is $X_2^2$%, a content of the specified composition 3 is $X_2^3$%, . . . a content of the specified composition n is $X_2^n$%.

In region 3, a content of the specified composition 1 is $X_3^1$%, a content of the specified composition 2 is $X_3^2$%, a content of the specified composition 3 is $X_3^3$%, . . . a content of the specified composition n is $X_3^n$%.

. . .

In region n, a content of the specified composition 1 is $X_n^1$%, a content of the specified composition 2 is $X_n^2$%, a content of the specified composition 3 is $X_n^3$%, . . . a content of the specified composition n is $X''_n$%.

Regions of the 3D entity are specified by local shapes of a 3D shape corresponding to the 3D entity. A surface of the 3D shape is generally represented with a polygonal modeling method, that is, the surface of the 3D shape is represented with a group of vertexes and a set of connection planes for connecting the vertexes. For example, in the common STL file, a 3D model is represented with a set of triangular surface patches. The STL file contains geometric information on multiple triangular surface patches, and information on each triangular surface patch includes three-dimensional coordinate values of three vertexes of the surface. A set of the triangular surface patches represent an enclosed surface, i.e., a surface of a 3D shape. Regions on the 3D shape are represented with a set including the polygonal surfaces and vertexes.

Figure 16:
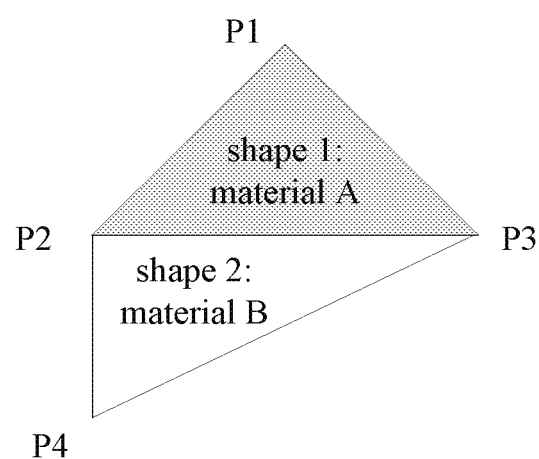
FIG. 16 is a schematic diagram showing a local material characteristic.

As shown in FIG. 16, a 3D local shape 1 corresponding to a surface represented by vertexes P1, P2 and P3 is made from a material A. A 3D local shape 2 corresponding to a surface represented by vertexes P2, P3 and P4 is made from a material B. Different regions of the 3D model file is displayed with different colors, to generate a 3D region distribution model. A robust characteristic of each 3D local shape is calculated, and a region is positioned by matching the robust characteristics, as shown in the following Table 2.

TABLE 2

| property | Material information ID | 3D region distribution model | region 1 information ID | region 2 information ID | region3 information ID | ... | region N information ID |
|---|---|---|---|---|---|---|---|
| type | Numeric value | File | Numeric value | Numeric value | Numeric value | ... | Numeric value |

In order to improve accuracy of positioning a region of the 3D entity, in the positioning, a 3D shape robust characteristic of a region to be positioned may be compared with not only a robust characteristic of a target region, but also robust characteristics of one or more regions adjacent to the target region. That is to say, for each region of the 3D entity, not only a 3D shape description for a current region is recorded (if the 3D shape is represented with multiple triangular surface patches, information on the 3D shape description includes vertex coordinates and connection relationship of the triangular surface patches), but also 3D shape robust characteristics of the current region and one or more adjacent regions are recorded, as shown in the following Table 3.

TABLE 3

| Property | material region information ID | Material description information | adjacent region 1 information ID | adjacent region 2 information ID | adjacent region 3 information ID | ... | adjacent region M information ID |
|---|---|---|---|---|---|---|---|
| Type | Numeric value | Text | Numeric value | Numeric value | Numeric value | ... | Numeric value |

After the protected original 3D entity and material usage information corresponding to the protected original 3D entity are obtained, information on one or more material characteristics is extracted. If information on a material visual characteristic of the protected original 3D entity is extracted as described above, the extracted information on the material visual characteristic includes a two-dimensional image used for extracting the visual characteristic, an extracted brightness histogram and an extracted chroma histogram, as shown in the following Table 4.

TABLE 4

| Property | material visual characteristic ID | material region information ID | Two-dimensional image | Brightness histogram | Chroma histogram |
|---|---|---|---|---|---|
| Type | Numeric value | Numeric value | File | Object | Object |

The material characteristic may also include a material perspective characteristic. Regarding a standard defined for transmittance of a material, for example, the transmittance can be measured with reference to a measuring methods described in "ISO 13468-1 Plastics—Determination of the Total Luminous Transmittance of Transparent Materials" and "ASTM D1003-13 Standard Test Method for Haze and Luminous Transmittance of Transparent Plastics".

A record of material perspective characteristic in the database may include measured transmittance and specific measuring condition, as shown in the following Table 5.

TABLE 5

| Property | Material perspective characteristic ID | Material region information ID | Transmittance | Description of transmittance measuring condition |
|---|---|---|---|---|
| type | Numeric value | Numeric value | Numeric value | Text |

A plastic material generally has a low ignition point and can be ignited under a normal condition. Different materials have different flame states when being ignited, different combustion states after the flames are taken away, different smokes, smells and the like generated during the combustion. Therefore, a combustion test is a simple and easy material distinguishing method. Therefore, in an exemplary embodiment, whether a material of a 3D entity to be detected is the same as a material of the protected original 3D entity can be determined based on a characteristic obtained after performing the combustion test on a sample of the 3D entity to be detected.

A specific combustion test method may refer to a horizontal combustion method described in "plastics combustion performance test method-horizontal combustion method, J. von Kries, Chromatic adaptation. Sources of Color Science. 1970: 12-13GB2408-80" and "ASTM D635—14 Standard Test Method for Rate of Burning and/or Extent and Time of Burning of Plastics in a Horizontal Position", or may refer to a smoke density measuring method described in "GB8323 GB/T 8323.1-2008 plastics, smoke generation, a first part: Smoke Density Test Method Guidelines" and "ASTM D2843 Standard test method for density of smoke from the burning or decomposition of plastics, a test method for density of smoke generated by burning or decomposition of plastics". The extracted combustion characteristic is shown in Table 6. A detection process for the combustion characteristic may be the same as those in the extraction process. Whether a material of the 3D entity to be detected is the same as a material of the protected original 3D entity is determined by comparing the combustion characteristic obtained from the 3D entity to be detected and combustion characteristic of the protected original 3D entity in the identification information database.

TABLE 6

| Property | Material combustion characteristic ID | Material region information ID | Flame color | Ignitability | Smoke/gas smell |
|---|---|---|---|---|---|
| Type | Numeric value | Numeric value | Text | Text | Text |

A Fourier Transform Infrared Spectroscopy (FT-IR) test is an effective method for identifying a material and analyzing a structure of the material. The material is identified by measuring an infrared absorption spectrum of a sample under an infrared light. The FI-IR test can measure composition in a cluster material quantitatively. An FI-IR test method may refer to "ASTM E1252-98(2013)e1 Standard Practice for General Techniques for Obtaining Infrared Spectra for Qualitative Analysis". An extracted characteristic includes a photo under the infrared light, an infrared spectrum image and the like, as shown in the following Table 7. An infrared characteristic detection process may be the same as the extraction process to extract an infrared spectrum image of the 3D entity to be detected, and compare the extracted infrared spectrum image with an infrared spectrum image of the protected original 3D entity in the identification information database.

TABLE 7

| Property | Material infrared characteristic ID | Material region information ID | Infrared photo | Infrared frequency spectrum | Infrared characteristic description |
|---|---|---|---|---|---|
| Type | Numeric value | Numeric value | File | Object | Text |

In addition, the identification process may be further performed with a material microstructure characteristic, a material reflectivity characteristic, a perspective structure characteristic under X-rays, and the like. Corresponding exemplary database information is shown in the following Table 8 to Table 10.

TABLE 8

| Property | Material microstructure characteristic ID | Material region information ID | Micro structure image | Micro structure description |
|---|---|---|---|---|
| Type | Numeric value | Numeric value | File | Text |

TABLE 9

| Property | Material reflectivity characteristic ID | Material region information ID | Reflectivity | Reflectivity test condition description |
|---|---|---|---|---|
| Type | Numeric value | Numeric value | Numeric value | Text |

TABLE 10

| Property | Perspective structure characteristic ID of material under X-rays | Material region information ID | Perspective photo under X-rays | Perspective structure description under X-rays |
|---|---|---|---|---|
| Type | Numeric value | Numeric value | File | Text |

Figure 9:
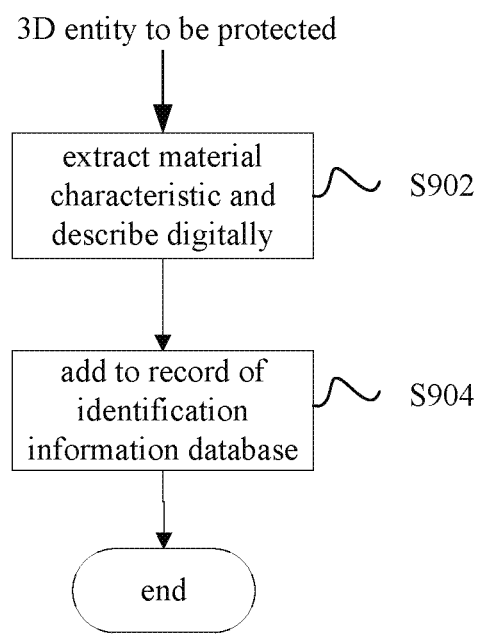
FIG. 9 is a flowchart showing an exemplary process of generating an identification information database according to an embodiment of the present disclosure.

FIG. 9 shows a flowchart of a process for generating an identification information database for a 3D entity. In step S902, for example, a material characteristic of a 3D entity to be protected is extracted, and is described digitally in the exemplary manner described above. In step S904, the material characteristic is added into the identification information database.

In a case that an entity to be detected is obtained, a counterfeit detection may be performed with information in the identification information database. A detection process includes the following steps. Firstly, a 3D entity to be detected is scanned to generate a 3D model, and a 3D shape robust characteristic of the 3D model is calculated for shape matching. The shape matching is performed by matching the robust characteristics. If the robust characteristics match with each other, the 3D shape is the same as or similar to a shape of a 3D entity in the identification information database. Calculation process and matching process for the robust characteristic are described above. If a 3D model with a same or similar shape is found in the identification information database, a material characteristic of the 3D entity to be detected is further extracted for material characteristic matching. If the material characteristics do not match with each other, it is determined that the 3D entity to be detected is counterfeit. A material characteristic extraction process for the 3D entity to be detected is the same as a material characteristic extraction process for the protected original 3D entity, thereby ensuring accuracy of the characteristic comparison. For example, in a case that a material visual characteristic is extracted, 2D images of the 3D entity are captured under a same light condition, thereby reducing a deviation of a detection result caused by a detection condition such as light. In addition, a chemical characteristic, a combustion characteristic, transmittance, reflectivity and the like of the material are extracted by a same test apparatus under a same test condition.

As described above, the identification information database may be stored in the information processing apparatus (i.e., an apparatus for identifying an entity) described above, or may be stored in a remote apparatus. Specifically, the identification information database may be established by a third party commissioned by the intellectual property owner, and a consumer may detect a counterfeit 3D entity using the information in the identification information database and a counterfeit detection service of the database.

Figure 4:
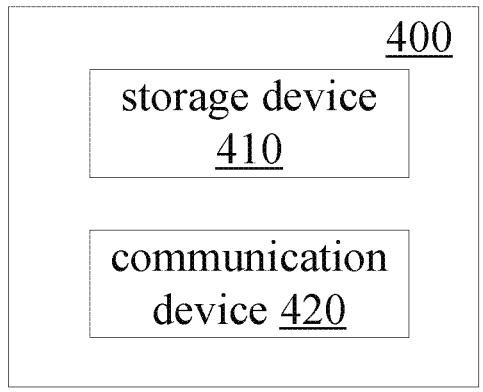
FIG. 4 is a block diagram showing a configuration example of an information processing apparatus according to another embodiment of the present disclosure.

An information processing apparatus for providing identification information is further provided according to an embodiment of the present disclosure, for example, the apparatus functions as the third party described above. As shown in FIG. 4, an information processing apparatus 400 according to the embodiment includes a storage device 410 and a communication device 420.

The storage device 410 stores a database of predetermined material characteristics of all 3D models in a 3D model set, and the predetermined material characteristic is correlated with at least one portion of a corresponding 3D model.

The communication device 420 is configured for: receiving, from a requester, a request for a predetermined material characteristic of a specific three-dimensional model; and transmitting the predetermined material characteristic of the specific three-dimensional model to the requester. Here, for example, the requester may correspond to an intellectual property owner to perform an identification operation, or may correspond to a consumer who hopes to perform an identification operation (for example, so as to determine whether a commodity obtained by the consumer is counterfeit or pirated).

As described above, the material characteristic may be represented with a visual characteristic. Accordingly, according to an embodiment, a material characteristic of a 3D model may include an image of a reference entity fabricated with a predetermined material based on the 3D model, and a material characteristic of a target entity may include an image of the target entity.

In addition, according to an embodiment, the database stored in the storage device 410 may further include shape characteristics of the 3D models. The communication device 420 is further configured for receiving, from a requester, a shape characteristic of a target entity and transmitting a predetermined material characteristic of a 3D model matching with the shape characteristic of the target entity to the requester. In this way, information on a material characteristic is provided only in a case that the shape of the target entity is the same as or similar to a shape of a 3D model.

According to an embodiment, the information processing apparatus may update the identification information database. Specifically, the communication device 420 may be further configured for receiving a predetermined material characteristic of a new 3D model, and the storage device 410 may be further configured for store the predetermined material characteristic of the new 3D model to the database. For example, the predetermined material characteristic of the new 3D model may come from an intellectual property owner, or other authorized parties such as a consumer who purchased a genuine entity.

An intellectual property owner of a 3D entity provides a protected original 3D entity, a 3D model, material description and usage information, related intellectual property information and the like which are required, to the third party establisher of identification information database. The establisher of the identification information database extracts a shape characteristic, a material characteristic and the like and stores the extracted information in a record of the database. The database may be established in a manner similar to that in the example described above, which is not described repeatedly here.

Particularly, in a case that the material characteristic is provided by the consumer, it is necessary to guarantee that the material characteristic is reliable. For example, in a case that a 2D visual image for detecting a visual characteristic is provided by the consumer, it is possible to cause a deviation of the visual characteristic since a light condition of the 2D visual images is different from a light condition of a 2D image corresponding to a visual characteristic of the original 3D entity. Accordingly, light correction is needed before calculating a visual characteristic based on the 2D visual image of the visual characteristic. The light correction includes performing light chroma estimation on a whole image and performing light chroma correction. The light chroma estimation may be realized with reference to a method described in "Kobus Barnard, Vlad Cardei, Brian funt, A comparison of computational color constancy algorithms; Part One: Methodology and Experiments with Synthesized Data, IEEE Transactions in Image Processing. 2002, 11(9):972-983" or "Kobus Barnard, Vlad Cardei, Brian funt A comparison of computational color constancy algorithms; Part One: Methodology and Experiments with Synthesized Data, IEEE Transactions in Image Processing. 2002, 11 (9): 985-996". For example, the light chroma correction may be realized with a von-Kries diagonal model (see "J. von Kries, Chromatic adaptation. Sources of Color Science. 1970: 12-13GB2408-80"). The light chroma of an image is changed globally, and the image under an unknown light condition is corrected to an image under a standard white light. A light brightness correction is mainly to correct an image, the light of which is no uniform, to an image, the light of which is uniform globally. A visual characteristic is extracted from a corrected image, thereby improving accuracy of visual characteristic matching. Similarly, other material characteristics should also be extracted under a same extraction condition as the protected original 3D entity. For example, the detection is realized by a dedicated instrument, a test instrument in which transmittance, reflectivity or the like comply with a same standard, or a detection mechanism having a dedicated instrument which complies with the standard. Test conditions for some visual characteristics have a little effect on a characteristic extraction result. In this case, the detection can be completed by the consumer based on the material characteristic found in the identification information database. Taking combustion characteristic as an example, different materials may be distinguished by observing a flame color when the material is combusted, a combustion state after the flame is taken away, a smoke or smell generated in the combustion, and the like.

Similar to the above embodiments, after the identification information database of 3D entity is established, a detection process corresponding to the database may be implemented by a 3D entity identification application. A consumer may download application software capable of completing a 3D entity identification function, and input a 3D model and various material characteristics of a 3D entity to be detected. The application software queries in the database and matches the shape characteristics and material characteristics.

Figure 11:
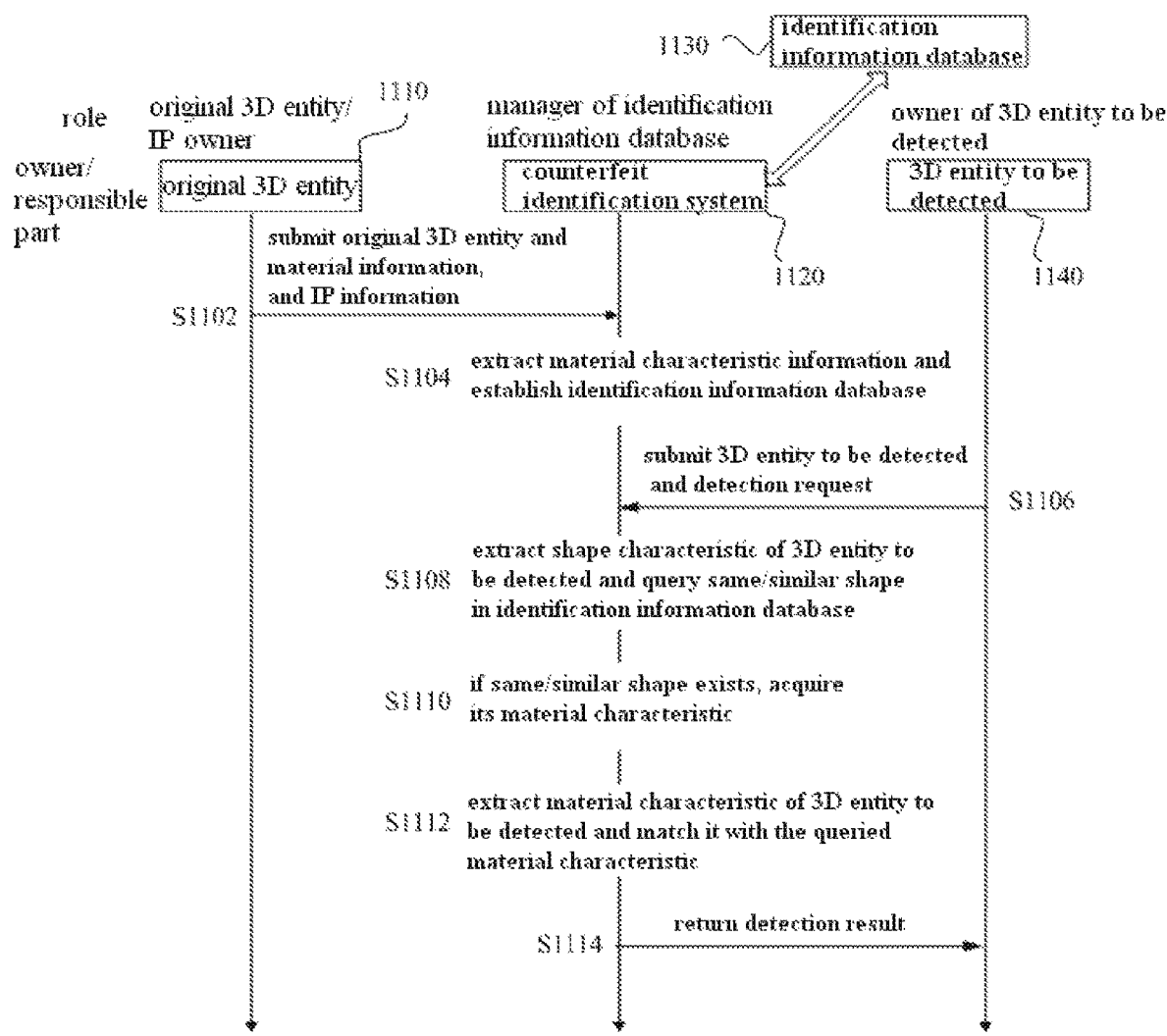
FIG. 11 is a schematic diagram showing an exemplary detection process performed by a three-dimensional model intellectual property detection system according to an embodiment of the present disclosure.

FIG. 11 shows an exemplary process in which an identification information database is established by a third party commissioned by an intellectual property owner, and a consumer detects a counterfeit 3D entity with information and a counterfeit detection service in the identification information database. Steps 1102 to 1104 relate to a process of establishing an identification information database 1130 performed between an intellectual property owner of an original 3D entity and a manager of an identification information database. Steps 1106 to 1114 relate to an identification process performed between an owner of an entity to be detected 1140 and a counterfeit identification system 1120. Processes in the steps are similar to the processes described above, and are not described repeatedly here.

Figure 12:
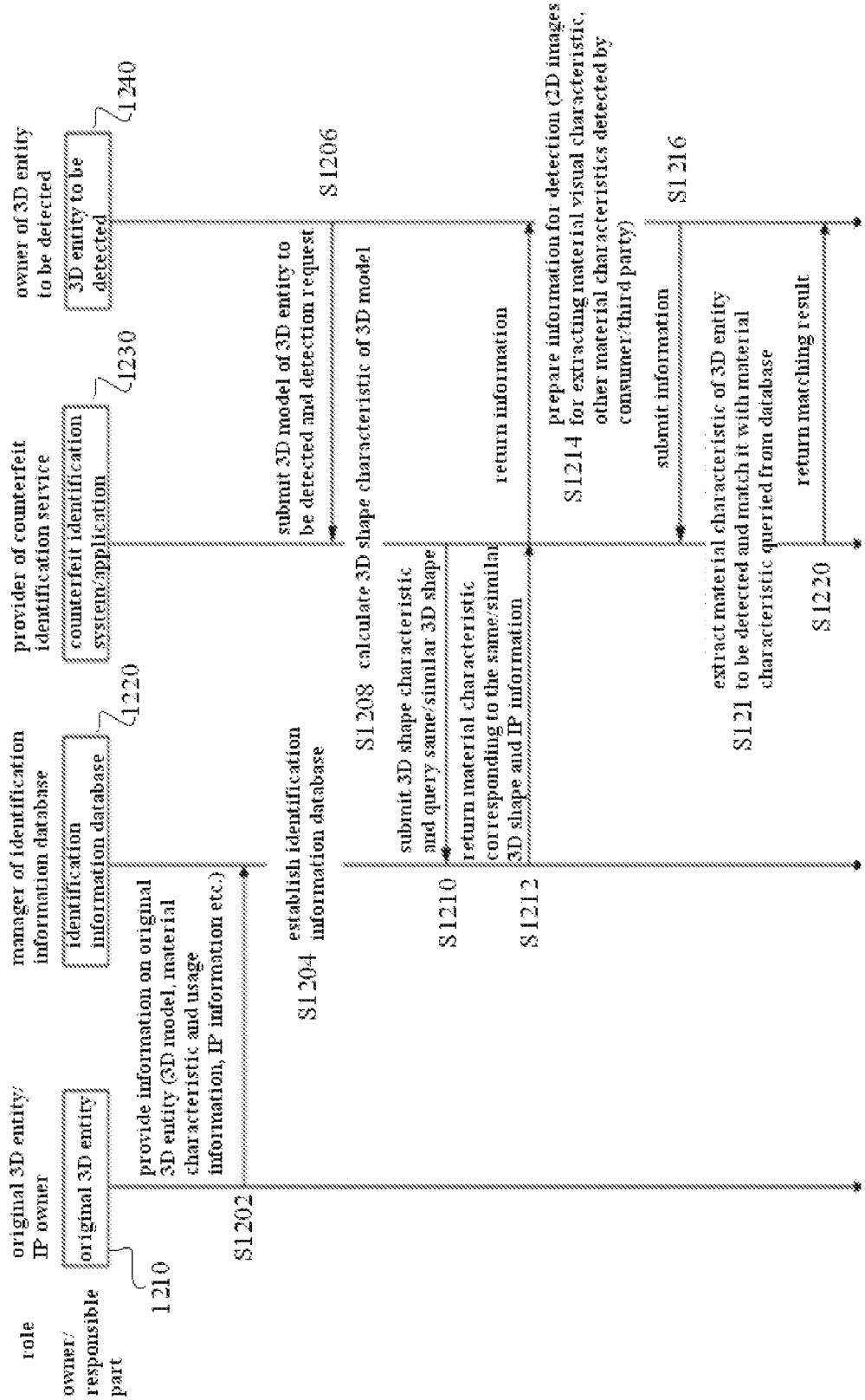
FIG. 12 is a schematic diagram showing an exemplary detection process performed by a three-dimensional model intellectual property detection system according to another embodiment of the present disclosure.

FIG. 12 shows an example in which a manager of an identification information database is separated from a provider of a counterfeit identification service. Steps 1202 to 1204 related to a process of establishing an identification information database 1220 performed between an intellectual property owner of an original 3D entity 1210 and the manager of the identification information database. Steps S1206 to S1220 related to an identification process performed between an owner of an entity to be detected 1240 and a counterfeit identification system/application 1230. Steps S1210 and S1212 relate to information interaction between the counterfeit identification system/application 1230 and the identification information database 1220. Processes of the steps are similar to those described above, and are not describe repeatedly here.

In another aspect, as described above, the identification information database may be established by an intellectual property owner to provide a counterfeit detection service to consumers.

A current 3D scanning apparatus can obtain a 3D model by scanning a 3D entity. Specifically, the 3D entity is generally scanned at multiple view angles by a built-in optical or infrared scanning system cooperating with a machine such as a rotating floor. A 2D image is obtained at each of the angles, and a 3D model is constructed with the 2D images at the multiple view angels. In the embodiment, shape matching is firstly performed on the 3D model file obtained by scanning and a 3D model in the identification information database. If the shapes is similar or the same, intellectual property detection is further performed. The material detection in the embodiment is mainly implemented in a non-destructive manner. The 2D images at multiple view angles of the 3D entity are obtained by an optical/infrared system, and visual analysis is performed on chroma, brightness or infrared reflection value of an object in the 2D images. A material characteristic of the object is extracted with the above described computer visual detection method and is matched with a given characteristic. Similarly, process information may be also analyzed based on the 2D image. Lastly, if a 3D entity is embedded with watermark, analysis is performed accordingly based on different embedded watermarks. If a watermark is directly printed on a surface of the 3D entity, the watermark is identified by analyzing the 2D image. If a watermark embedded with a 3D shape, the watermark is identified based on a local 3D shape. If a watermark is embedded with different materials, the watermark is identified with an infrared system. In the embodiment, a 3D intellectual property detection system is embedded in the 3D scanning apparatus, and a material/process/watermark is detected automatically by the 3D scanning apparatus, for ease of use.

Figure 13:
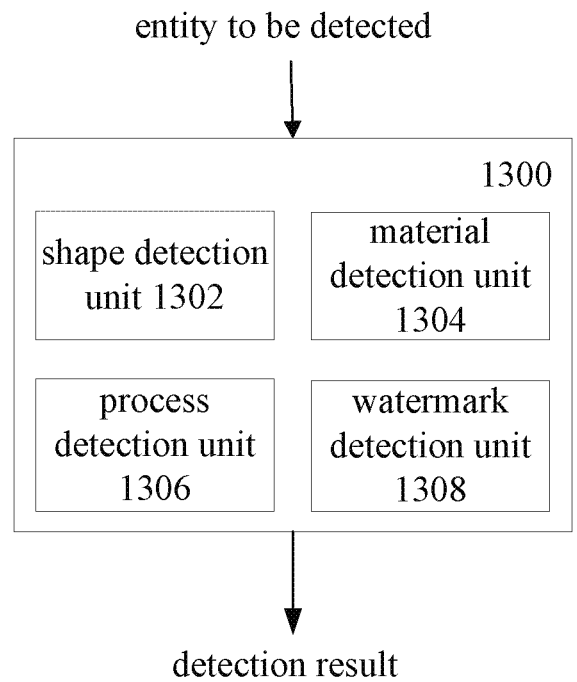
FIG. 13 is a block diagram showing an exemplary configuration of a three-dimensional model intellectual property detection system according to an embodiment of the present disclosure.

FIG. 13 shows a configuration example of a 3D entity intellectual property detection system. A detection system 1300 includes a shape detection unit 1302, a material detection unit 1304, a process detection unit 1306 and a watermark determination unit 1308. The units may perform corresponding detection processes in the manners described above. It should be understood that, the embodiments of the present disclosure are not limited to the example, and may only include a portion of the units described above.

Figure 14:
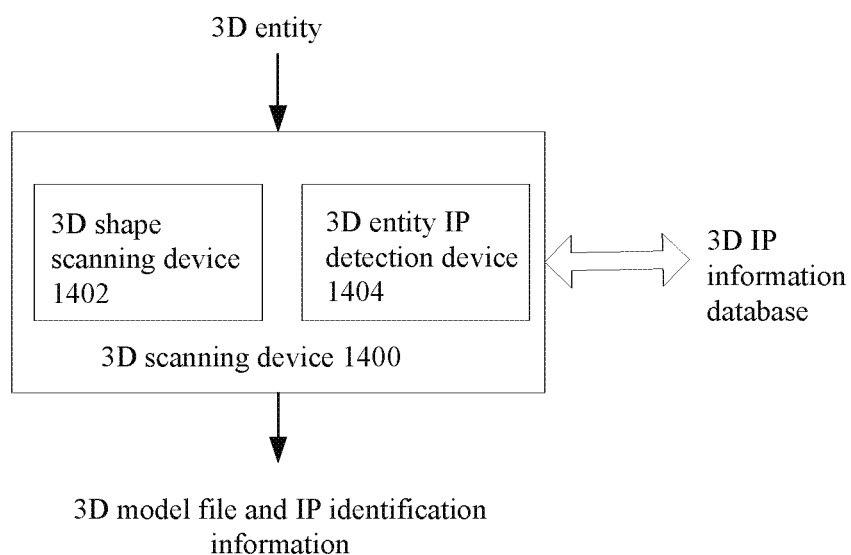
FIG. 14 shows a block diagram showing an exemplary configuration that an intellectual property identification device is embedded in a 3D scanning apparatus according to an embodiment of the present disclosure.

FIG. 14 shows a configuration example in which an intellectual property detection device 1404 together with a 3D shape scanning device 1402 are embedded in a 3D scanning device 1400.

Figure 15:
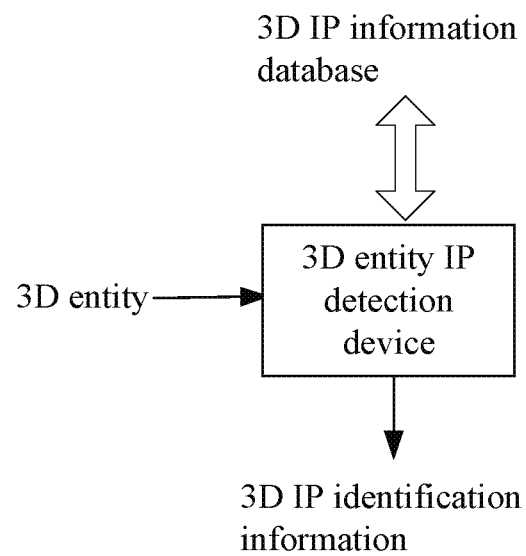
FIG. 15 shows a block diagram of an exemplary configuration of an intellectual property identification device for independently providing an identification service according to an embodiment of the present disclosure.

FIG. 15 shows a configuration example in which an intellectual property detection device 1500 of a 3D entity is arranged independently.

Figure 5:
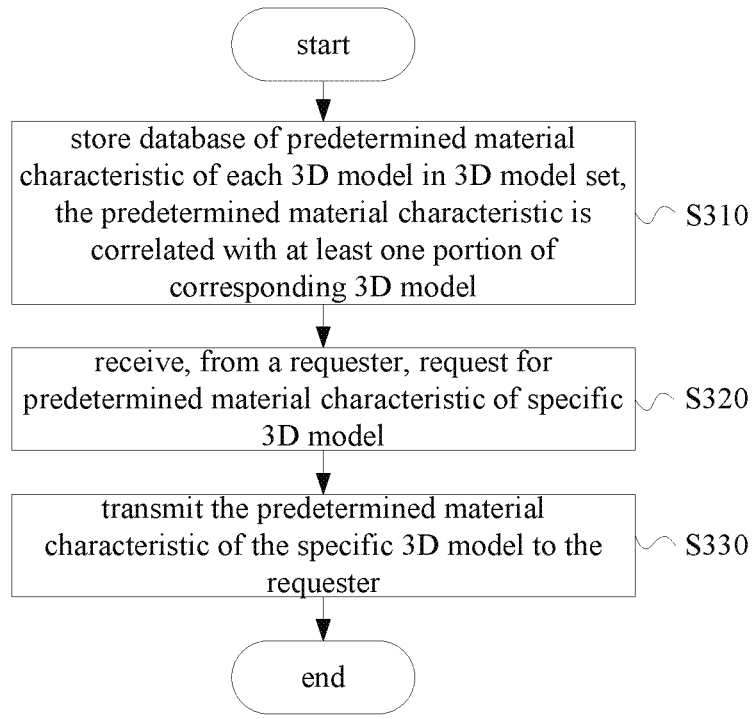
FIG. 5 is a flowchart showing a process example of an information processing method according to an embodiment of the present disclosure.

In addition, the embodiments of the present disclosure further include an information processing method performed by a party providing the identification information. As shown in FIG. 5, an information processing method according to an embodiment includes the following steps.

In step S510, a database of predetermined material characteristics of each 3D model in a 3D model set is stored, and the predetermined material characteristic is correlated with at least one portion of a 3D model.

In step S520, a request for a predetermined material characteristic of a 3D model is received from a requester.

In step S530, the predetermined material characteristic of the 3D model is transmitted to the requester.

Figure 7:
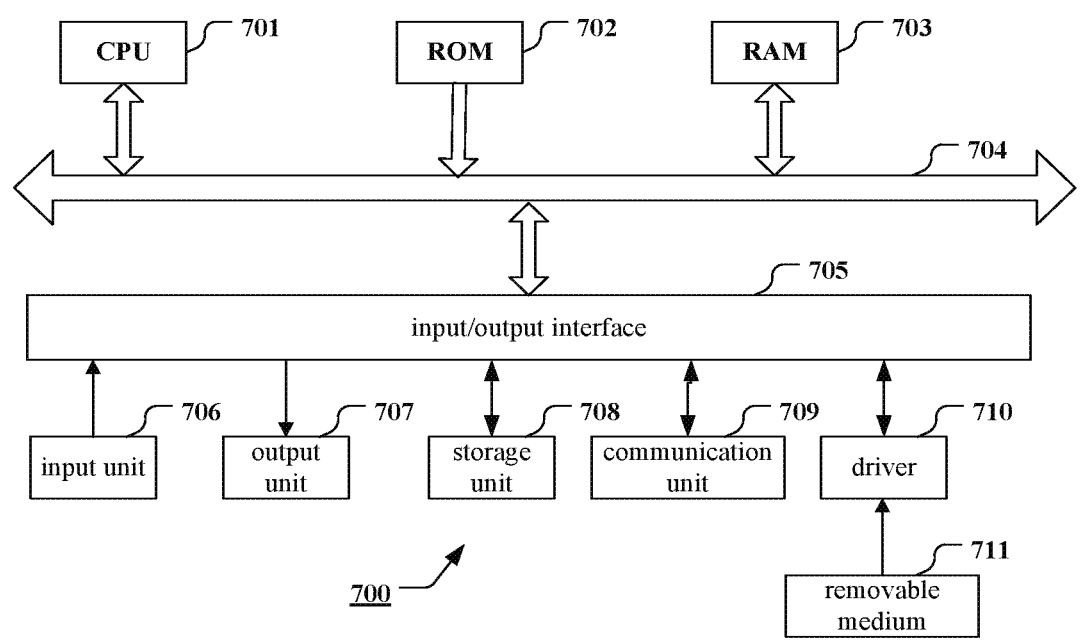
FIG. 7 is a block diagram showing an exemplary structure of a computer for implementing a method and an apparatus according to the present disclosure.

FIG. 7 shows exemplary structure of a computer implementing the method and apparatus according to the present disclosure. In FIG. 7, a central processing unit (i.e., CPU) 701 executes various processing according to a program stored in a read-only memory (ROM) 702 or a program loaded to a random access memory (RAM) 703 from a storage unit 708. The data needed for the various processing of the CPU 701 may be stored in the RAM 703 as needed. The CPU 701, the ROM 702 and the RAM 703 are linked with each other via a bus 704. An input/output interface 705 is also linked to the bus 704.

The following components are linked to the input/output interface 705: an input unit 706 (including keyboard, mouse and the like), an output unit 707 (including displays such as a cathode ray tube (CRT), a liquid crystal display (LCD), a loudspeaker and the like), a storage unit 708 (including hard disc and the like), and a communication unit 709 (including a network interface card such as a LAN card, modem and the like). The communication unit 709 performs communication processing via a network such as the Internet. A driver 710 may also be linked to the input/output interface 705 as needed. A removable medium 711, for example, a magnetic disc, an optical disc, a magnetic optical disc, a semiconductor memory and the like, may be installed in the driver 710, so that the computer program read therefrom is installed in the storage unit 708 as needed.

In the case where the present application is realized by software, a program constituting the software is installed from the Internet or a storage medium such as the removable medium 711.

It should be appreciated by those skilled in the art that the memory medium is not limited to the removable medium 711 shown in FIG. 7, which has program stored therein and is distributed separately from the apparatus so as to provide the programs to users. For example, the removable medium 711 may be a magnetic disc (including floppy disc (registered trademark)), a compact disc (including compact disc read-only memory (CD-ROM) and digital versatile disc (DVD), a magneto optical disc (including mini disc (MD) (registered trademark)), and a semiconductor memory. Alternatively, the memory medium may be the hard discs included in ROM 702 and the storage unit 708 in which programs are stored, and can be distributed to users along with the device in which they are incorporated.

An embodiment of the present disclosure further relates to a program product storing machine-readable instruction codes. When being read and executed by a machine, the instruction codes can execute the above method according to the embodiments of the present disclosure.

Accordingly, a memory medium for carrying the program product in which machine-readable instruction codes are stored is also covered in the present application. The memory medium includes but is not limited to soft disc, optical disc, magnetic optical disc, memory card, memory stick and the like In the above description of the embodiments of the present disclosure, features that are described and/or illustrated with respect to one embodiment may be used in the same way or in a similar way in one or more other embodiments, in combination with or instead of the features of the other embodiments.

It should be emphasized that the term "comprises/include" when used in this specification is taken to specify the presence of features, elements, steps or components, but does not preclude the presence or addition of one or more other features, elements, steps or components.

In the above embodiments and examples, the steps and/or units are represented with reference numbers consists of numbers. It should be understood by those skilled in the art that, these reference numbers are only convenient for description and drawing, and are not intended to represent an order of the steps and units or to represent any other constraint.

In addition, the method according to the present disclosure are not limited to be executed in the chronological order described in the specification, and may be executed sequentially, parallel or separately in other chronological order. Therefore, the execution order of the method described in the specification is not intended to limit the technical scope of the present disclosure.

While the present disclosure has been disclosed with reference to the specific embodiments thereof, it should be understood that all of the above embodiments and examples are illustrative rather than restrictive. Various modifications, improvements and equivalents can be designed for the present disclosure by those skilled in the art without departing from the scope and spirit of the accompanying claims. The modifications, improvements or equivalents are regarded to be included within the protection scope of the present disclosure.

The invention claimed is:

1. An information processing apparatus, comprising:
one or more processors configured to
acquire a shape characteristic of a target entity;
determine a degree of similarity between the shape characteristic of the target entity and a shape characteristic of a three-dimensional model based on a shape robust characteristic calculated from the three-dimensional model and including a set of vectors that remain unchanged under robustness operations including a blurring of a shape of the target entity;
acquire a material characteristic of a material included in a designated region of the target entity in a case where the shape characteristic of the target entity matches with the predetermined shape characteristic;
determine an extent to which the acquired material characteristic of the target entity matches a predetermined material characteristic based upon a magnitude of differences between the acquired material characteristic and the predetermined material characteristic, wherein the predetermined material characteristic is correlated with a designated region of the three-dimensional model;

determine that the target entity is one of a genuine copy and a pirated copy based on the determined extent to which the acquired material characteristic of the target entity matches the predetermined material characteristic; and report to a requestor, using a communication device, a result of the determination that the target entity is one of the genuine copy and the pirated copy.

2. The information processing apparatus according to claim 1, wherein the three-dimensional model comprises a three-dimensional printing model.

3. The information processing apparatus according to claim 1, wherein the shape characteristic of the target entity is obtained by scanning the target entity.

4. The information processing apparatus according to claim 1, wherein the predetermined material characteristic comprises: a specific composition contained in a material; or a specific composition combination of a material.

5. The information processing apparatus according to claim 1, wherein the material characteristic and the predetermined material characteristic are characterized by a visual characteristic.

6. The information processing apparatus according to claim 5, wherein
the determining the extent to which the acquired material characteristic of the target entity matches the predetermined material characteristic comprises: matching an image of the target entity with an image of a reference entity, wherein the reference entity is made from the material having the predetermined material characteristic according to the three-dimensional model.

7. The information processing apparatus according to claim 1, wherein the material characteristic and the predetermined material characteristic comprise one or more of: a chemical property, a microstructure characteristic, a combustion characteristic, a dissolving characteristic, a transmittance, a reflectivity, a perspective structure characteristic under X-rays, and a position and/or an embedding manner of a specific material in an entity.

8. The information processing apparatus according to claim 1, further comprising:
a storage device configured to store a predetermined material characteristics of each three-dimensional model in a predetermined three-dimensional model set.

9. An information processing method, comprising:
acquiring a shape characteristic of a target entity;
determining a degree of similarity between the shape characteristic of the target entity and a shape characteristic of a three-dimensional model based on a shape robust characteristic calculated from the three-dimensional model and including a set of vectors that remain unchanged under robustness operations including a blurring of a shape of the target entity;

acquiring a material characteristic of a material included in a designated region of the target entity in a case where the shape characteristic of the target entity matches with the predetermined shape characteristic;

determining an extent to which the acquired material characteristic of the target entity matches a predetermined material characteristic based upon a magnitude of differences between the acquired material characteristic and the predetermined material characteristic, wherein the predetermined material characteristic is correlated with a designated region of the three-dimensional model; and determining that the target entity is one of a genuine copy and a pirated copy based on the determined extent to which the acquired material characteristic of the target entity matches the predetermined material characteristic; and reporting to a requester, using a communication device, a result of the determination that the target entity is one of the genuine copy and the pirated copy.

10. The information processing apparatus according to claim 1, wherein the degree of similarity between the shape characteristic of the target entity and the shape characteristic of the three-dimensional model is determined by comparing a shape robust characteristic of the three-dimensional model with a shape characteristic of at least one portion of the target entity and comparing the shape robust characteristic of the three-dimensional model with a plurality of additional portions of the target entity that are adjacent to the at least one portion of the target entity.

11. The information processing method according to claim 9, further comprising:
determining the degree of similarity between the shape characteristic of the target entity and the shape characteristic of the three-dimensional model includes comparing the shape robust characteristic of the three-dimensional model with a shape characteristic of at least one portion of the target entity, and comparing the shape robust characteristic of the three-dimensional model with a plurality of additional portions of the target entity that are adjacent to the at least one portion of the target entity.

12. The information processing apparatus according to claim 1, wherein the three-dimensional model comprises a three-dimensional printing model of the genuine copy.

13. The information processing apparatus according to claim 1, wherein the one or more processors is further configured to determine the degree of similarity between the shape characteristic of the target entity and the shape characteristic of the three-dimensional model based on the shape robust characteristic that further includes the set of vectors that remain unchanged under robustness operations including a rotating of the shape of the target entity.

* * * * *